United States Patent Office 3,208,999
Patented Sept. 28, 1965

3,208,999
PREPARATION OF NON-INHIBITED STARCH AMINES
Wadym Jarowenko, Plainfield, and Morton W. Rutenberg, North Plainfield, N.J., assignors to National Starch and Chemical Corporation, New York, N.Y., a corporation of Delaware
No Drawing. Filed Sept. 9, 1964, Ser. No. 395,315
5 Claims. (Cl. 260—233.3)

This application is a continuation-in-part of our co-pending application, Serial No. 161,403, filed December 22, 1961, now abandoned.

This invention relates to a method for the preparation of starch amines from intact granule, cyanoalkylated starches and to the starch amines thereby prepared. More particularly, this invention relates to the preparation of essentially non-inhibited, aminoalkyl starch ethers from intact granule, cyanoalkylated starches.

It is the object of this invention to provide an efficient, low cost procedure for preparing primary amine starch derivatives, said procedure being one which is operable in aqueous media and which will not hydrolyze the starch molecule, effect its inhibition or destroy its intact granule form. A further object of this invention involves the preparation of electropositive starch amine derivatives which are characterized by their unique colloidal properties which include improved dispersibility and stability. Further objects and advantages of our invention will be apparent from the following description.

Starch derivatives which possess electropositive charges provide the practitioner with a class of materials offering many unusual advantages over ordinary starches. Thus, for example such derivatives are particularly useful for applications involving either the coating or sizing of textiles or paper wherein they display a high degree of attraction towards electronegative subtrates. In attempting to prepare these electropositive derivatives, one approach has involved the introduction of amine groups onto the starch molecule. By producing such starch amines, and particularly primary amine starches, the practitioner is not only able to obtain the advantages of an electropositive derivative but is also providing starch products having reactive sites which would allow such derivatiives to be readily reacted with various reagents such as aldehydes, epoxy compounds, and acylating agents, etc.

Primary starch amines have heretofore, for the most part, been made by reacting starch with ethylene imine. However, their preparation by this method has not lent itself to commercial production due to the prohibitive cost of the ethylene imine.

In the above identified copending application, there is described a novel procedure for the preparation of amino-alkyl starch ethers by the reduction of cyanoalkylated starches by treatment of the latter with a reducing agent such as stannous chloride, sodium borohydride, hydrazine hydrate, sodium hydrosulfite, 1,3-dihydroxypropanone, lithium aluminum hydride, and nascent hydrogen.

Since the filing of the latter application, we have found that it is preferable to employ sodium borohydride, hydrazine hydrate, sodium hydrosulfite, and 1,3-dihydroxypropanone as the reducing agents in the process of our invention. Thus, whereas the use of any of the four latter reducing agents makes it possible to produce primary aminoalkyl starch ethers which are essentially uninhibited and therefore entirely suitable for commercial utilization, the use, as reducing agents, of stannous chloride, lithium aluminum hydride, or nascent hydrogen leads, in contrast, to the preparation of primary aminoalkyl starches which are usually unsuitable for commercial utilization as a result of the fact that they are extensively inhibted. By "inhibition," we refer, of course, to the phenomenon whereby a starch or a starch derivative having an intact granule structure is treated in such a manner that its granules will no longer disintegrate, or will only partially disintegrate, under conditions whereby such granules would ordinarily fully swell and burst, i.e., whereby gelatinization would occur.

As a result of this extensive granule inhibition, aminoalkyl starches which have been prepared with the use, in the process of our invention, of reducing agents other than sodium borohydride, hydrazine hydrate, sodium hydrosulfite and 1,3-dihydroxypropanone will be found to exhibit exceedingly poor dispersibility on the part of their heated aqueous suspensions which are ordinarily referred to as "cooks." Thus, for example, the cooks of such inhibited, intact granule aminoalkyl starches tend to readily settle on standing at room temperature. Such settling results from the fact that their inhibited starch granules are resistant to swelling under normal cooking conditions and therefore remain undispersed, or only party dispersed, at the end of the cooking cycle.

The mechanism which accounts for this granule inhibition is thought to result from a chemical crosslinking reaction which effects a toughening of the intact granule structure of the aminoalkyl starch molecule. It is believed that this crosslinking reaction reults from the formation of secondary amine crosslinks in the resulting aminoalkyl product.

In any event, the fact remains that, now by the use of either sodium borohydride, hydrazine hydrate, sodium hydrosulfite or 1,3-dihydroxypropanone, it has been found possible to produce aminoalkyl starch derivatives whose lack of inhibition permits their being cooked under normal boiling water temperatures. Needless to say, such products can, therefore, be successfully employed for the coating or sizing of textiles or paper inasmuch as the conventional cooking apparatus employed in the textile and paper mills can, of course, effect the dispersion of such non-inhibited materials whereas inhibited materials would be entirely inoperative in such conventional apparatus.

In addition to leading to the preparation of essentially non-inhibited products, the use of either sodium borohydride, hydrazine hydrate, sodium hydrosulfite or 1,3-dihydroxypropanone is also greatly enhanced by the fact that the latter reducing agents are fully operable in completely aqueous media or in mixtures of water with water miscible solvents and do not require the utilization of non-aqueous solvents as is the case, for example, with stannous chloride or lithium aluminum hydride. This dependence upon organic solvent media, on the part of the latter reducing agents, has been found to be economically prohibitive inasmuch as the solvents are themselves far more expensive than water and their use, on a commercial scale, requires the installation of costly solvent recovery systems. Thus, although the use of a solvent system might be justified for higher priced pharmaceuticals and speciality reagents, a starch product cannot ordinarily command the price required by the necessary high cost of such solvent systems.

We have also found that the process of our invention is of far greater commercial interest when limited to the use, therein, of cyanoalkyl starches which still retain their intact granule structure. Thus, it is well known in the art that starch occurs in nature in the form of a granule of complex structure. When suspended in water and heated to a sufficient degree (varying for each starch type) or when subjected to sufficient alkalinity, these intact granules will swell and disintegrate, i.e., gelatinize, so as to result in the preparation of a hydrated colloidal dispersion wherein the individual particles comprising the intact granules no longer exist. This is often referred to as "dissolving" the starch or forming a starch "solution," although these are not solutions in the purest form of the word. It is also well known that once a starch granule has been gelatinized and "dissolved," and the "solution" dried, as by passing over heated drums or by other drying means, the solid "pre-gelatinized" product thus obtained no longer possesses an intact granule structure.

Thus, when pregelatinized cyanoalkyl starches are utilized in the process of our invention, their initial dispersion requires their admixture with substantial quantities of water in view of their tendency to form extremely viscous solutions. This extensive dilution leads, in turn, to the need for higher concentrations of reagents as well as for the use of expensive, heavy duty mixing equipment. In contrast, intact granule cyanoalkyl starches require admixture with substantially less water inasmuch as they do not disperse or dissolve to form highly viscous solutions but merely remain suspended in a completely heterogeneous system. In addition, there is also a problem of separating the resulting cold water soluble, pregelatinized products from the homogeneous systems wherein they have been prepared. The latter problem does not, of course, exist when intact granule cyanoalkyl starches are employed since the resulting products are not dispersed or dissolved in a homogeneous system but are, rather, the solid phase of a heterogeneous system and may, therefore, be simply removed by means of filtration or centrifugation. In contrast, the products derived from pregelatinized cyanoalkyl starches must be recovered from their homogeneous systems by means of expensive and time-consuming separation procedures such, for example, as by the use of an alcohol precipitation technique, or by the use of a spray drying or drum drying procedure.

It should be noted that the preceding discussion relating to the present limitation to the use, as the base material in the process of our invention, of intact granule cyanoalkyl starches, does not preclude the gelatinization, subsequent to their preparation, of the resulting primary aminoalkyl starch ethers. Thus, the latter products may then be converted into cold water dispersible, pregelatinized products by being passed over heated drums or by any other convenient means.

The process of our invention is thus seen to involve the preparation of essentially non-inhibited, intact granule aminoalkyl starch ethers by the reduction, in an aqueous medium, of intact granule cyanoalkylated starches. This process has been found to result in electropositive amine starch derivatives possessing unusual colloidal properties. Moreover, the mild conditions inherent in our process avoid any severe hydrolysis of the starch molecule or any disruption of its intact granule structure.

Our process is operable with all cyanoalkylated starches. Such derivatives are readily prepared by reacting starch with a nitrile containing reagent such as acrylonitrile, chloroacetonitrile, or chloropropionitrile and epoxy alkyl nitriles such as epoxy butyronitrile. Methods for preparing such cyanoalkylated starches are well known to those skilled in the art and do not comprise a novel aspect of the process of our invention.

Although the subsequent description of the process of our invention will relate primarily to the preparation of aminopropyl starch derivatives resulting from the reduction of cyanoethyl starch ethers, it is to be understood that our process may be similarly applied for the preparation of a variety of aminoalkyl starches by the reduction of the appropriate cyanoalkyl starch ether bases wherein the alkyl group of said cyanoalkyl starch ethers may contain from 2 to 3 carbon atoms.

The starch base for cyanoalkylation reactions may be derived from such sources as corn, potato, tapioca, wheat, sago, high amylose corn, waxy maize, waxy sorghum, sweet potato, arrowroot, and rice, etc. These starch bases may be further treated as with heat and/or acids or with oxidizing agents to form so-called thin-boiling starches; or, they may be chemically derivatized, as by means of an etherification, provided that they still retain their intact granule form and sufficient hydroxyl groups are still present on the starch molecule so as to allow for their later conversion to cyanoalkylated derivatives containing at least 0.10%, by weight, of nitrogen on a dry basis.

The reducing agents which are operable in the process of our invention include sodium borohydride, hydrazine hydrate, 1,3-dihydroxypropanone, and sodium hydrosulfite. From the above group, we have found that optimum results are obtained by the use of either sodium borohydride or sodium hydrosulfite.

The amount of reducing agent which is to be used will depend upon the nitrile content of the cyanoalkyl starch undergoing reduction. This nitrile content, as expressed in terms of the precent, by weight, of nitrogen on a dry basis, can vary from the above noted minimum of 0.10% up to 4.0% nitrogen, on a dry basis. Thus, for a complete reduction of all nitrile groups to amine groups, the reducing agent should be present in slight excess of stoichiometric concentration. However, where desired, the practitioner may wish to retain some nitrile groups in the resulting derivative and such a partial reduction would, of course, require the use of a less than stoichiometric amount of the chosen reducing agent.

In order to entirely eliminate or substantially reduce inhibition in the resulting aminoalkyl derivatives due to the formation of secondary amines, the reaction should preferably be conducted in the presence of a large excess of ammonium hydroxide. Although the use of primary and secondary amines has also been proposed for the suppression of secondary amines in reactions of this type, it has been found, surprisingly, that their use was ineffective in the process of this invention as they tended to peptize the starch granule. Thus, only ammonium hydroxide was specific, in this reaction, in preventing all or most granule inhibition.

The reaction medium which is employed for our reduction process will ordinarily be water although solutions of water admixed with water miscible organic solvents may also be used if so desired. With some few exceptions the actual reaction conditions which are utilized do not vary appreciably. Ordinarily, the cyanoalkyl starch is first suspended in water, or in a solution of water with a water miscible organic solvent, in a concentration which may range from one part of the starch in from about 1.25 to 5.0 parts of the reaction medium, i.e., the water or the water-solvent blend. The reaction system is thus a heterogeneous one wherein the solid phase comprises the intact granule cyanoalkyl starch ether suspended in the continuous phase comprising the water or water-solvent blend.

Where required, ammonium hydroxide or a primary or secondary amine is then introduced. Under agitation, the selected reducing agent is added at a rapid rate whereupon agitation is then continued for about 16 hours. The reduction is preferably conducted at room temperature although, under some circumstances, temperatures of about 50° C., or higher, may be used provided that gelatinization conditions are avoided. Following the completion of the reaction, the derivative may be recovered by any convenient technique such as by the filtration or centrifugation of the reaction mass. The separated derivative may then be purified by being washed with water, resuspended, acidified to a pH of about 3, washed free of salts and then dried.

In any event, the primary amine starches prepared by the process of our invention are characterized by their excellent colloidal properties which include their improved dispersibility and stability.

Improved dispersibility is best observed in sedimentation or settling tests. Thus, since, on cooking, inhibited starches exhibit limited ability to disperse in water, they will, on being suspended in water, ultimately settle and form a sediment at the bottom of the container wherein they were suspended. An increase in the degree of inhibition of a starch or starch derivative will accelerate its settling and lead to a smaller total sediment volume because of tighter packing on the part of the less hydrated material. The improved dispersibility of our aminoalkyl ethers is similarly evidenced by these sedimentation tests since their increased dispersibility leads to less settling because their particles are more hydrated and therefore yield a greater total volume of sediment of hydrated particles. The electropositive nature of our derivatives is also easily demonstrated by electrophoresis or zeta potential measurements.

The unique combination of properties displayed by the derivatives of our invention permits them to be utilized in a wide variety of applications and particularly for the coating or sizing of textiles and paper products. They may also be used as co-catalysts and as stiffeners in the manufacture of urethane foams. Moreover, when properly formulated, they can be used in any number of adhesive specialties.

The following examples will further illustrate the embodiment of our invention. In these examples all parts given are by weight unless otherwise noted.

Example 1

This example illustrates the use of various reducing agents for the preparation of aminopropyl starch ethers by the reduction of cyanoethylated corn starch bases having an intact granule structure.

In preparing these derivatives, the basic procedure utilized comprised the suspension of the intact granule cyanoethylted corn starch base in 1.25–3.0 parts of water for each part, by weight of starch. To these suspensions were then added from 0.6–0.9 part of concentrated (58%) ammonium hydroxide whereupon the indicated amount of the selected reducing agent was introduced at a rapid rate. The reaction mixture was next agitated for 16 hours at room temperature and the resulting aminopopyl derivative was then filtered, washed with water, resuspended, acidified to a pH of 3, washed free of salts and then air dried.

The following table presents the pertinent data relating to the various derivatives which were prepared and also lists any variations from the above described procedure.

| Derivative # | Percent by wt., Nitrogen in Base | Reducing Agent | Percent by wt., on Starch of Reducing Agent | Moles of Reducing Agent per Mole CN of Starch Base |
|---|---|---|---|---|
| 1[a] | 0.11 | $Na_2S_2O_4$ | 6.0 | 4.4 |
| 2 | 0.14 | $NaBH_4$ | 0.38 | 1.0 |
| 3 | 0.27 | $Na_2S_2O_4$ | 6.4 | 1.88 |
| 4 | 0.36 | $Na_2S_2O_4$ | 6.4 | 1.42 |
| 5 | 0.74 | $Na_2S_2O_4$ | 19.0 | 2.01 |
| 6 | 1.03 | $Na_2S_2O_4$ | 19.0 | 1.47 |
| 7 | 1.47 | $Na_2S_2O_4$ | 24.2 | 1.32 |
| 8 | 2.25 | $Na_2S_2O_4$ | 40.0 | 1.42 |
| 9 | 2.30 | $Na_2S_2O_4$ | 10.0 | 0.35 |
| 10[b] | 3.48 | $Na_2S_2O_4$ | 168.0 | 3.86 |
| 11 | 3.48 | $Na_2S_2O_4$ | 168.0 | 3.86 |
| 12 | 2.30 | $NaBH_4$ | 5.5 | 0.90 |
| 13[c] | 2.30 | $NaBH_4$ | 5.5 | 0.90 |
| 14 | 3.48 | $NaBH_4$ | 9.2 | 0.99 |
| 15 | 3.48 | $NaBH_4$ | 14.4 | 1.55 |
| 16 | 0.56 | $N_2H_4 \cdot H_2O$ | 2.4 | 1.20 |
| 17[d] | 3.48 | $N_2H_4 \cdot H_2O$ | 14.4 | 1.16 |
| 18 | 3.48 | $N_2H_4 \cdot H_2O$ | 14.4 | 1.16 |
| 19 | 3.48 | $N_2H_4 \cdot H_2O$ | 7.2 | 0.58 |
| 20 | 0.56 | 1,3-dihydroxy-propanone. | 4.0 | 1.12 |
| 21 | 2.50 | ----do---- | 16.2 | 1.01 |
| 22[e] | 0.55 | $Na_2S_2O_4$ | 13.8 | 2.01 |
| 23[e] | 0.55 | $Na_2S_2O_4$ | 51.5 | 9.10 |

[a] Base was a reaction product of corn starch with chloracetonitrile rather than with acrylonitrile. The resulting product was thus an aminopropyl derivative.
[b] A 1:1 methanol:water mixture was used as the reaction medium.
[c] The reduction was conducted at 50° C. rather than at room temperature.
[d] A 1:1 methanol:water mixture was used as the reaction medium.
[e] The base was a cyanoethylated potato starch rather than a cyanoethylated corn starch.

In all cases the resulting aminopropyl starch derivatives were essentially non-inhibited and were found to possess useful colloidal properties. Electrophoretic analysis indicated that each of these derivatives was electropositive whereas the base materials were not.

Summarizing, the process of our invention is thus seen to provide a convenient, economical method for the preparation of essentially non-inhibited aminoalkyl starch ethers possessing a variety of useful properties. Variations may be made in proportions, procedures and materials without departing from the scope of this invention as defined by the following claims.

We claim:

1. A process for the preparation of an intact granule, primary aminoalkyl starch ether, said process comprising the steps of suspending an intact granule cyanoalkyl starch ether in an aqueous reaction medium selected from the class consisting of water and solutions of water with a water miscible organic solvent, and reacting said starch ether with a reducing agent selected from the group consisting of sodium borohydride, hydrazine hydrate, 1,3-dihydroxypropanone, and sodium hydrosulfite.

2. The process of claim 1, wherein the alkyl group of said intact granule cyanoalkyl starch ether contains from 2 to 3 carbon atoms.

3. The process of claim 1, wherein the concentration of said intact granule cyanoalkyl starch ether in said reaction medium is one part by weight of starch ether to from 1.25 to 5.0 parts by weight of said reaction medium.

4. The process of claim 1, wherein said reaction is conducted in the presence of ammonium hydroxide as a secondary amine suppression agent.

5. The process of claim 1, wherein said intact granule cyanoalkyl starch ether contains from 0.10 to 4.0% of nitrogen on a dry weight basis.

References Cited by the Examiner
UNITED STATES PATENTS 2,917,506 12/59 Caldwell _____ 260—233.3
3,070,594 12/62 Harris _____ 260—233.3

WILLIAM H. SHORT, *Primary Examiner.*
LOUISE P. QUAST, *Examiner.*